March 31, 1970  N. SINGER  3,503,612
WORD FORMING GAME APPARATUS
Filed Aug. 22, 1967  7 Sheets-Sheet 1
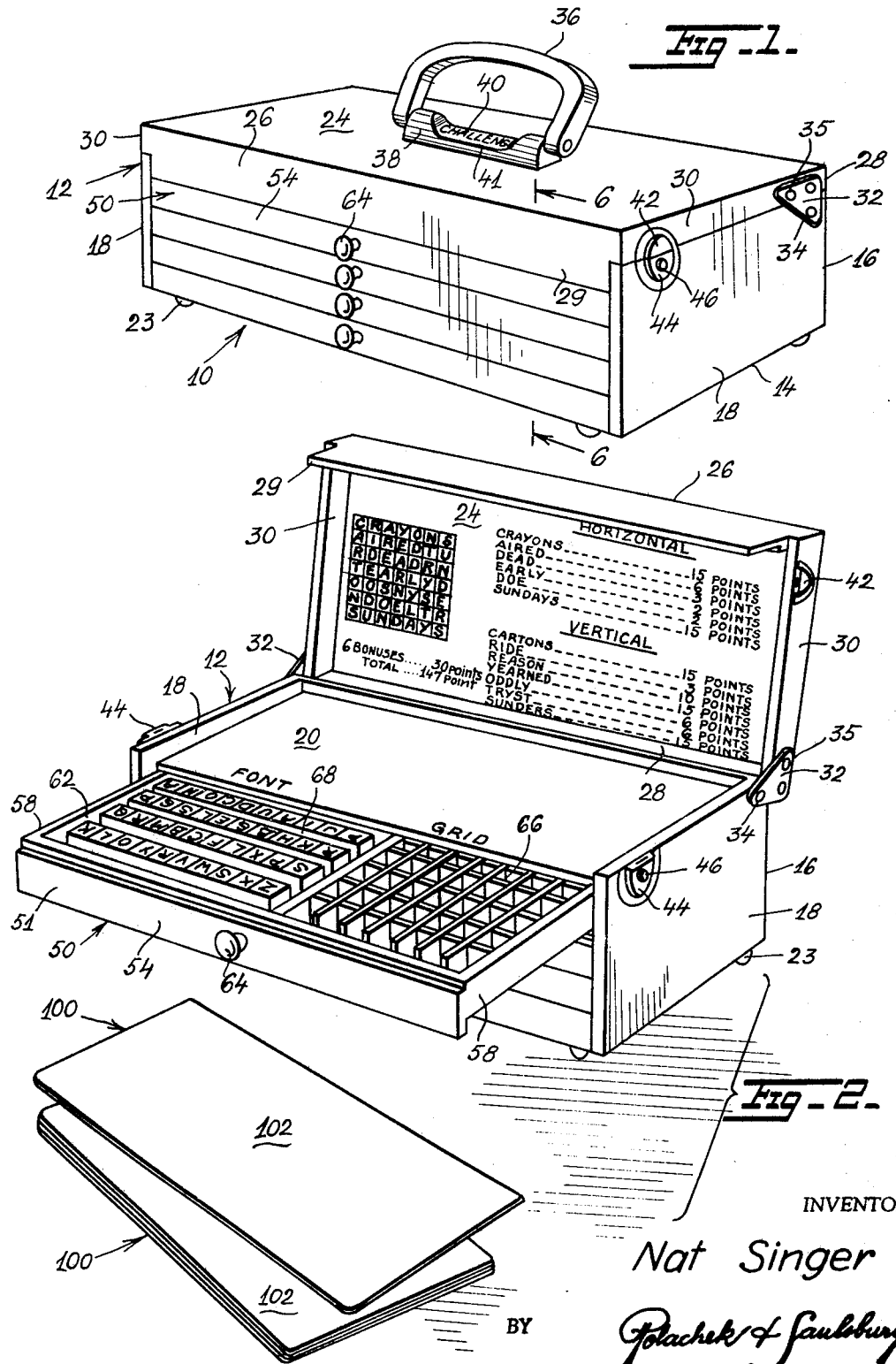
INVENTOR
Nat Singer
BY Polachek & Saulsbury
ATTORNEYS March 31, 1970     N. SINGER     3,503,612
WORD FORMING GAME APPARATUS
Filed Aug. 22, 1967     7 Sheets-Sheet 2
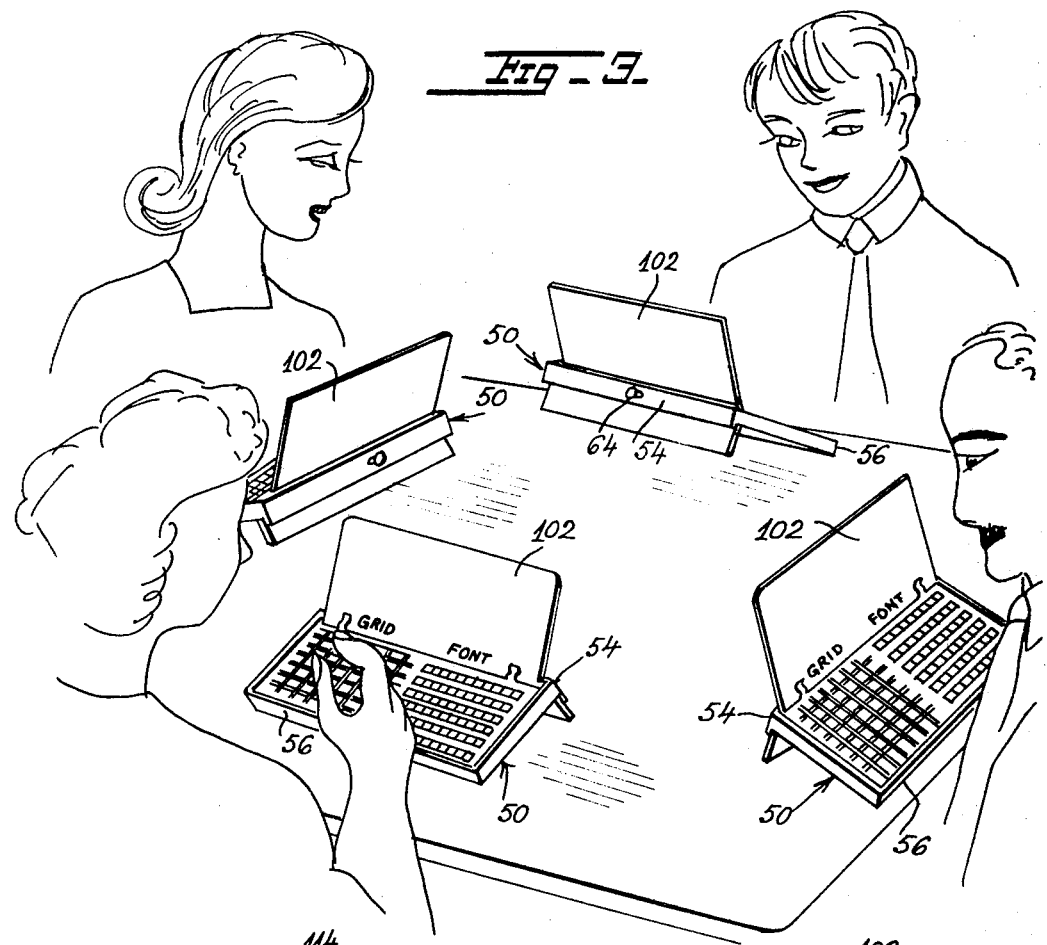
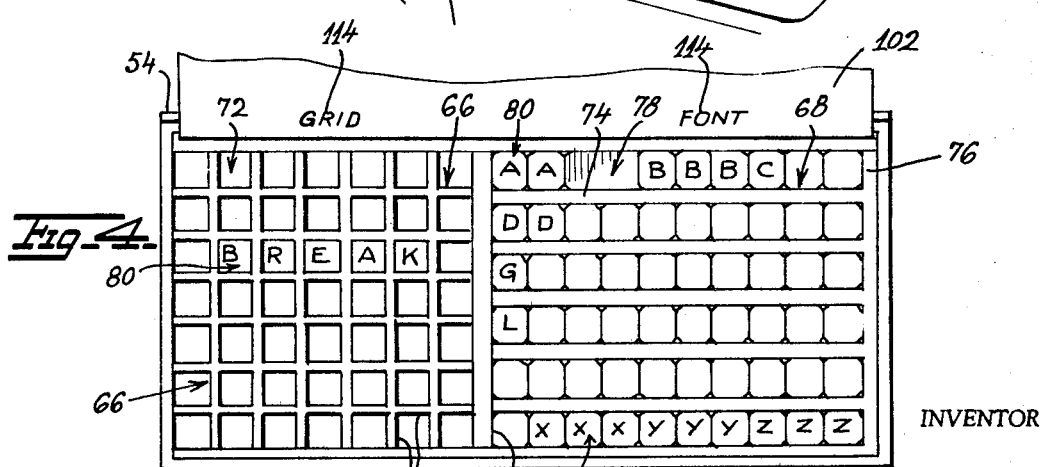
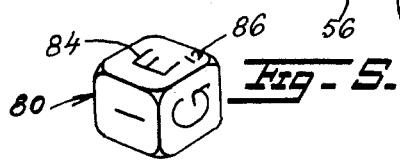
INVENTOR
Nat Singer
BY
ATTORNEYS March 31, 1970 N. SINGER 3,503,612
WORD FORMING GAME APPARATUS
Filed Aug. 22, 1967 7 Sheets-Sheet 3
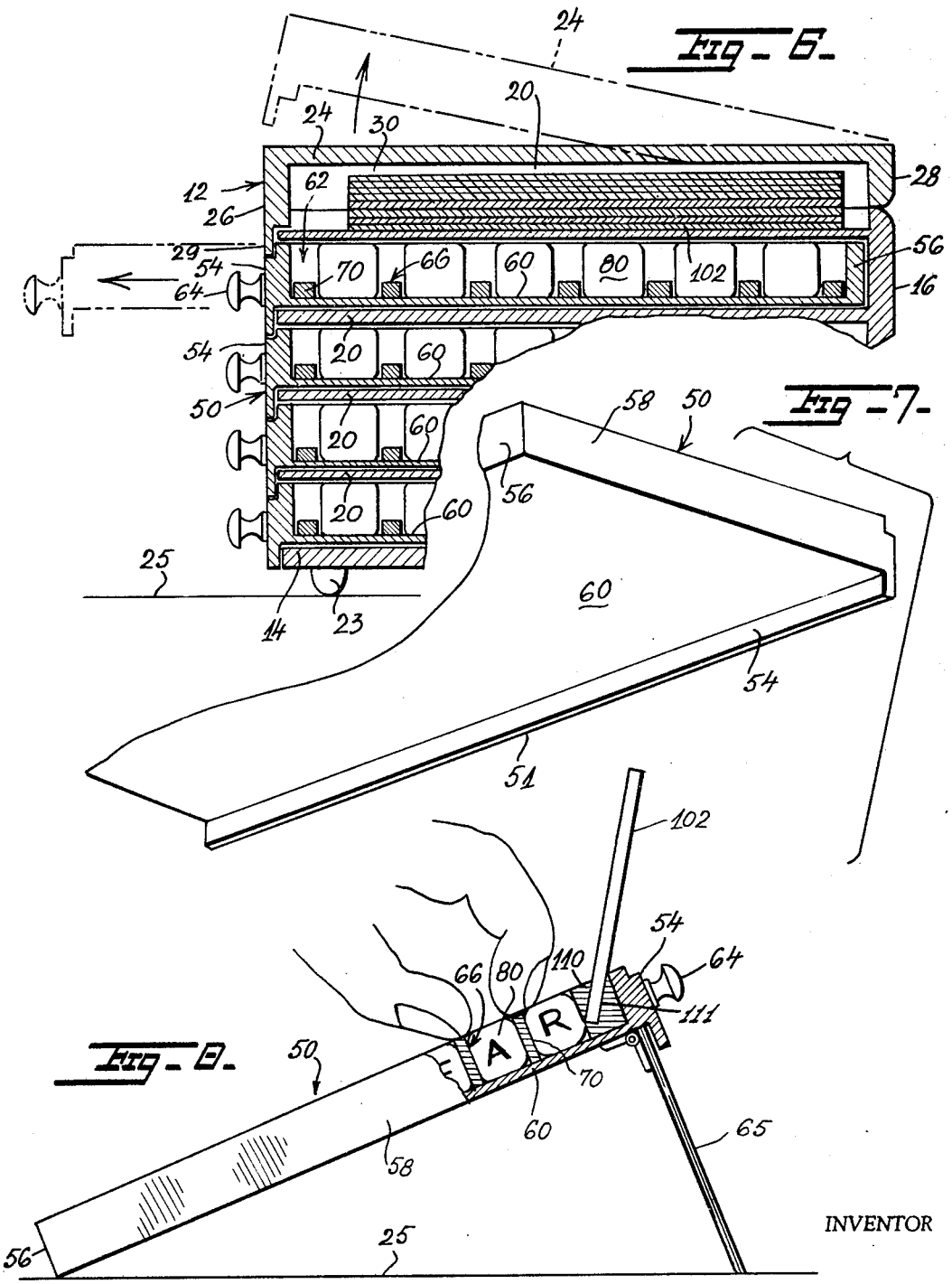
INVENTOR
Nat Singer
BY Polachek & Saulsbury
ATTORNEYS

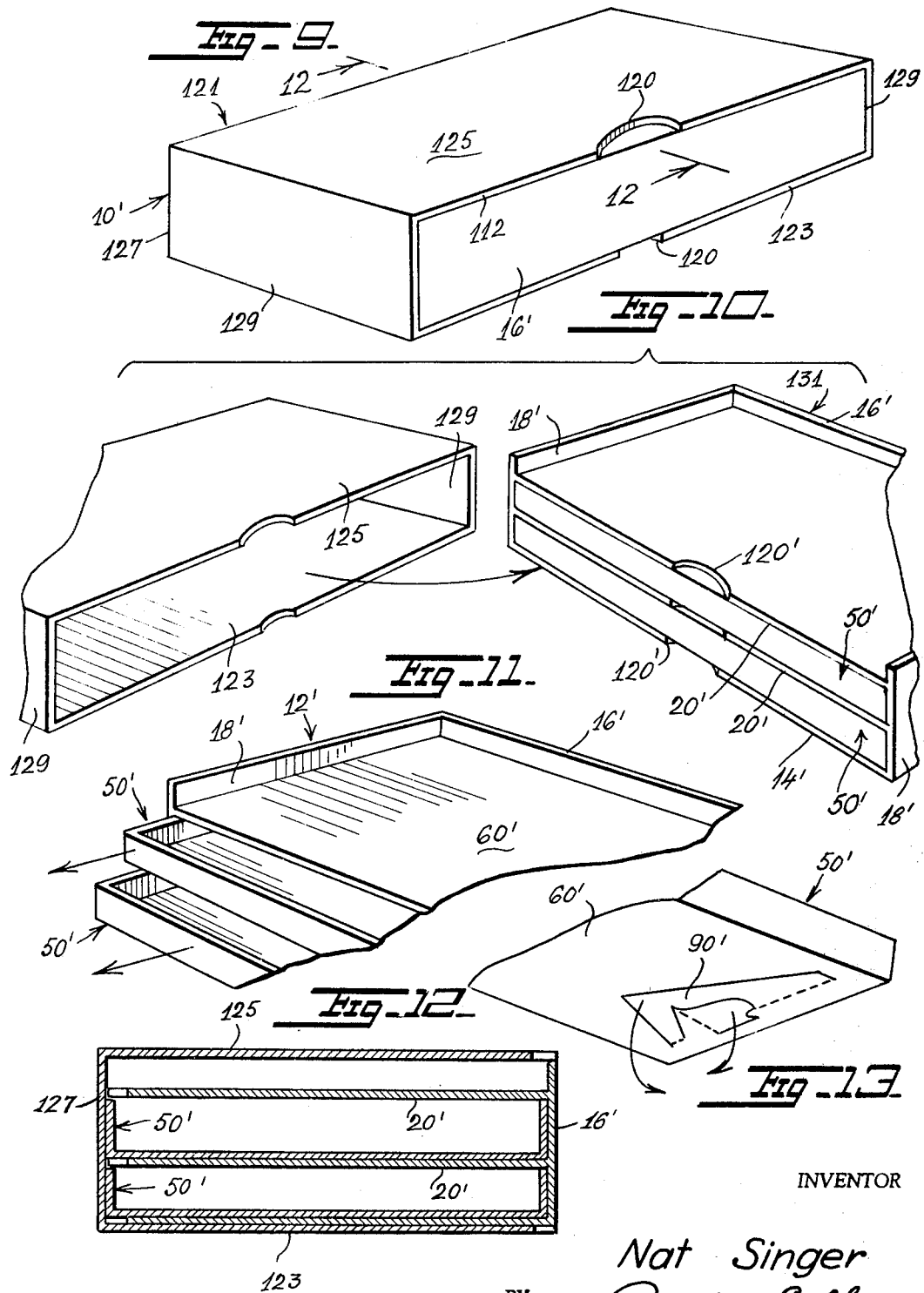

March 31, 1970 N. SINGER 3,503,612
WORD FORMING GAME APPARATUS
Filed Aug. 22, 1967 7 Sheets-Sheet 5
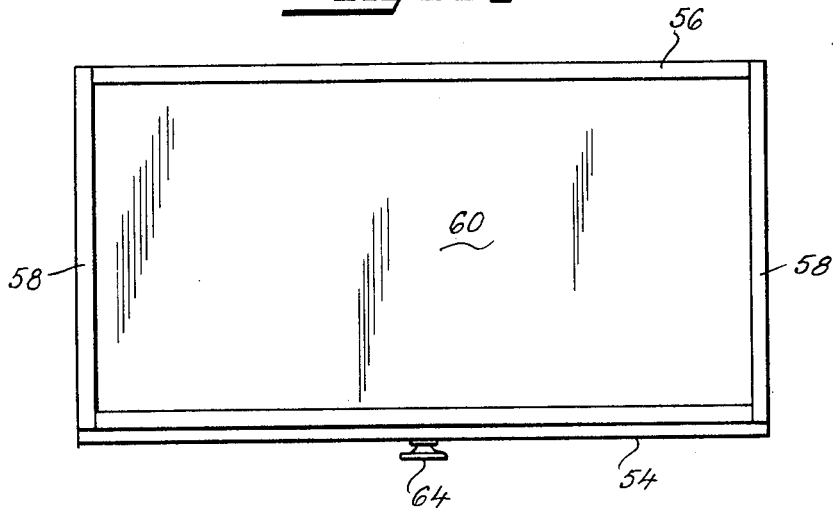
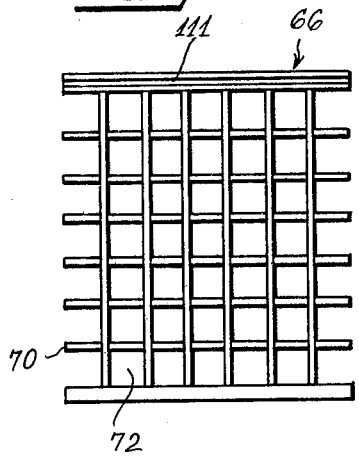
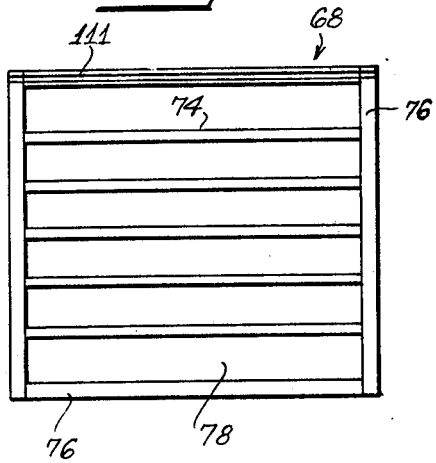
INVENTOR
*Nat Singer*

March 31, 1970  N. SINGER  3,503,612
WORD FORMING GAME APPARATUS
Filed Aug. 22, 1967  7 Sheets-Sheet 6

Point Values of Words 7 letter words -- 15 points
6 letter words -- 10 points
5 letter words -- 6 points
4 letter words -- 3 points
3 letter words -- 2 points 5 point bonus for each pair of 7 letter words which intersect.

149

Index of Letter Cubes

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | L | P | S | W | R | E | S | N | S | J | S | E | D | A | S | S | V | H | Z | U |
| 2 | U | O | O | E | E | A | L | E | L | U | E | A | E | T | M | E | I | E | E | N |
| 3 | N | S | D | T | D | T | O | A | O | S | A | T | S | O | O | A | C | A | B | S |
| 4 | A | I | E | F | S | R | H | T | W | T | L | I | P | M | K | I | T | R | R | A |
| 5 | T | N | A | O | I | E | L | E | E | O | N | O | I | E | M | O | T | A | F |  |
| 6 | E | G | R | N | X | B | N | Y | R | N | Q | G | T | C | R | P | P | R | Y | S E |

145

INVENTOR
Nat Singer
BY Polachek & Saulsbury
ATTORNEYS

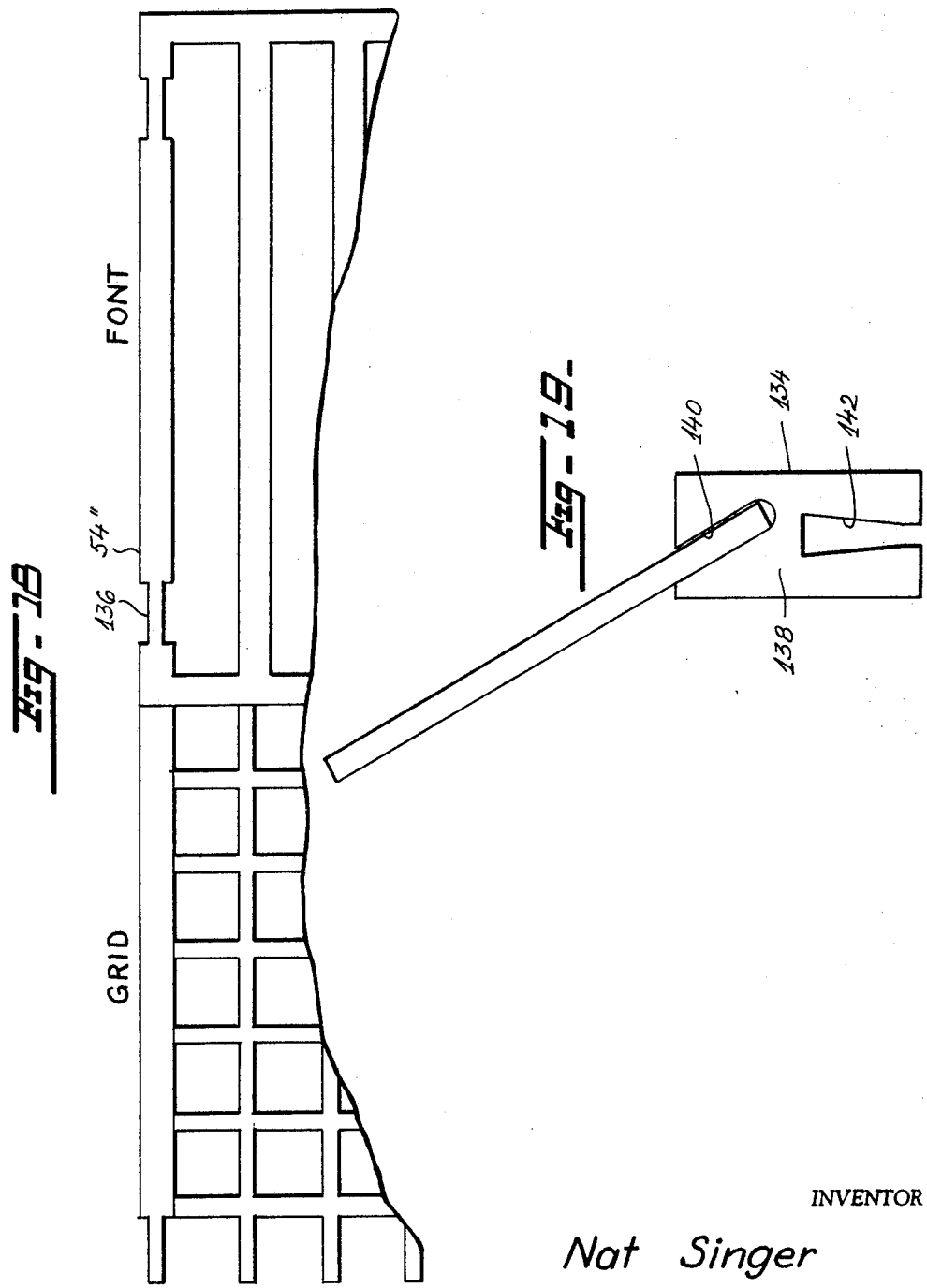

United States Patent Office 3,503,612
Patented Mar. 31, 1970

3,503,612
WORD FORMING GAME APPARATUS
Nat Singer, 35 McClellan St., Bronx, N.Y. 10452
Filed Aug. 22, 1967, Ser. No. 662,390
Int. Cl. A63f 3/00
U.S. Cl. 273—130                                    2 Claims

ABSTRACT OF THE DISCLOSURE

A kit for housing gameboards and playing pieces therefor having a hollow compartmented body with gameboards removably mounted in the compartments, each gameboard having a recess for removably receiving a frame for playing pieces and a grid for removably receiving said playing pieces. An easel is foldably mounted on each gameboard adapted to support the gameboard at a slight angle to the horizontal when seated on a supporting surface. Shields are provided for concealing the gameboards from opponents and an index sheet is provided for indicating point values of words and for indicating playing pieces to be used by the players

---

A principal object of the invention is to provide a word game that is interesting and entertaining and will retain its interest and excitement for the players for prolonged periods.

Another object of the invention is a word game that is flexible in its operation and in which the conditions of the game can be constantly manipulated in so many ways that endless variations are afforded, maintaining constant player interest.

A further object of the invention is a word game affording an opportunity for the players to exhibit their skill in forming words and also providing a degree of chance and luck in the competition enabling a less skilled player to compete favorably with a greater skilled player.

Yet another object is a word game which can be controlled so that it can be played by adults of various skills and even by children with equal interest and satisfaction.

A specific object of the invention is to provide an apparatus for working a crossword puzzle thereby replacing the printed sheet and writing implement ordinarily used in working crossword puzzles, the apparatus being adapted to be used repeatedly and indefinitely.

BRIEF DESCRIPTION OF THE VIEWS OF THE DRAWINGS

FIGURE 1 is a top perspective view of a kit housing one form of game apparatus embodying the invention, the kit being shown in closed condition.

FIG. 2 is a similar view but showing the kit opened, and a drawer pulled out, exposing the game pieces, some of the game pieces being shown removed.

FIG. 3 is a perspective view showing a number of players using a number of the game apparatus embodying the present invention.

FIG. 4 is a top plan view of the improved game board, a number of dice being shown in playable position, parts being shown broken away.

FIG. 5 is a top perspective view of a playing piece.

FIG. 6 is a vertical sectional view taken on the plane of the line 6—6 of FIG. 1, parts being shown broken away.

FIG. 7 is a bottom fragmentary perspective view of the gameboard of FIG. 4.

FIG. 8 is a side elevational view of the gameboard in operative playable position, showing several dice in position.

FIG. 9 is a top perspective view of a modified form of kit housing a modified form of gameboards therein.

FIG. 10 is a fragmentary disassembled perspective view of the kit and gameboard compartments therein, showing a step in the assembly.

FIG. 11 is a fragmentary top perspective view of a number of gameboards used with the kit of FIG. 9.

FIG. 12 is a cross-sectional view taken on the plane of the line 12—12 of FIG 9.

FIG. 13 is a bottom perspective view of and end of one of the gameboards shown in FIG. 11.

FIG. 14 is a top plan view of one of the drawers shown in FIGURES 1 and 2.

FIG. 15 is a top plan view of the font shown in FIGURE 4.

FIG. 16 is a top plan view of the grid shown in FIGURE 4.

FIG. 17 is a top plan view of the index sheet.

FIG. 18 is a top plan view of a fragment of a gameboard embodying a modified form of the invention.

FIG. 19 is a plan view of a shield-supporting clip adapted to be used with the gameboard of FIG. 18

DETAILED DESCRIPTION OF THE DRAWINGS

Referring now in detail to the various views of the drawings, in FIG. 1 there is illustrated a kit 10 housing a number of gameboards embodying the invention and playing pieces thereof. The kit 10 is of a box-like configuration and may be formed of wood, plastic or other suitable material.

The kit has a rectangular shaped deep body 12 with bottom wall 14, rear wall 16, and end walls 18, 18, and is open at the front and top as viewed in FIGS. 1 and 2. A series of spaced thin partition walls 20 divide the interior of the body into narrow compartments extending the length of the body and from the open front to the rear wall 16. The bottom wall 14 carries depending rubber, metal or plastic feet 23 at the corners thereof for supporting the kit on a horizontal flat supporting surface 25.

A rectangular cover 24 is provided for closing the opening in the top of the body. This cover is formed of the same material as the body of the kit and is formed with downwardly extending flanges 26 and 28, at the front and rear, respectively, and with downwardly extending flanges 30, 30 at the ends. The front flange 26 is formed with an integral downward extension 29. The cover is hingedly connected to the top edges of the end walls 18, 18, at the rear thereof, by means of cover hinges in the form of triangular shaped metal plates 32, 32 fastened at one apical point to the end walls 18 by means of pivot pins 34, the other apical points of each plate being fixed to the adjacent end flange 30 by pins 35. The cover hinges hold the cover 24 at a reading angle. Any other type hinge may be used if attached so as to hold cover 24 at a reading angle. An inverted U-shaped handle 36 of wood, plastic or metal is pivotally mounted on the top surface of the cover by means of an elongated wood, plastic or metal block 38 secured to the top of the cover lengthwise thereof by means of screws. The top surface of the block 38 is dished at 40 and may carry identifying indicia 41. Coacting male and female latching devices 42 and 44, respectively, are secured to the end flanges 30 of the cover and the top edges of the end walls 18, 18, respectively, at the front thereof, for releasably locking the cover on the body. A movable button 46 on the female latching device is provided for releasing the locking mechanism to open the cover.

In accordance with the present invention, a crossword puzzle gameboard 50 (see FIGS. 2 and 3) is removably mounted in each compartment in the body 12 of the kit. The gameboard is constituted by a drawer 51 slidably fitted in the compartment. The drawer 51 comprises a rectangular shaped frame of wood, plastic or metal having a front sill 54, rear sill 56, and end sills 58, 58 attached to each other at their ends and connected across by a panel of pasteboard, wood, plastic or metal constituting a bottom or base 60. The sills and panel define a shallow recess 62. A knob 64 of metal, wood or plastic is preferably fixed on the outer surface of the front sill 54, for manipulating the drawer. The recess 62 is occupied by a removable grid or grille 66 and by a frame constituting a font 68 both of which seat on the base or bottom 60. The fronts of the drawers are made to interlock so that they will not slide out when the cover is closed (see FIGURE 6). The cover locks the upper drawer in place.

The grid or grille 66 is formed by criss-crossed metal, plastic or wooden rails 70 defining square shaped openings or pockets 72. Back strip 110 has angled slot 111 shown in FIG. 8 to accommodate shield 102. The showing of slot 111 is omitted from FIG. 6 for simplification of the drawing. In the present embodiment the grid is shown as having seven vertical rows each having seven pockets 72. In other embodiments the grid will conisst of five vertical rows each having five pockets; nine vertical rows each having nine pockets; eleven vertical rows each having eleven pockets and twenty-one vertical rows each having twenty-one pockets.

The font 68 is formed by elongated rails 74 joined at the ends by cross rails 76, the rails defining elongated openings 78. In this embodiment, the font is shown as having six openings 78. Back strip 118 has angled slot 111 to accommodate shield 102. In other embodiments the font will have four openings; ten openings; fourteen openings and twenty-eight openings. The font and grid are seated on the base or bottom 60 of the drawer 51, which bottom serves as a base or bottom for the font and grid.

A plurality of playing pieces in the form of six-faced dice or cubes 80 covering the entire alphabet and of the requisite number of each letter to enable the players to carry out the game is provided. The cubes 80 are adapted to be remoably mounted in the openings 78 of the font 68, and are adapted to be fitted in the square pockets 72 of the grid 66. The playing pieces fit in the pockets of the grid so that they remain in inserted position until manually removed. Each cube or die 80 indicia 84 of the faces thereof, such as the letters of the alphabet. A small numeral such as indicated at 86 in FIG. 5 is preferably imprinted on one face of each die or cube. This numeral is not used for scoring but for identifying purposes or the like in replacing the cubes. In the present embodiment a font 68 of three sets of twenty cubes 80 each, totaling sixty cubes, is provided. In other embodiments a suitable number of cubes for each gamesize is provided.

In this embodiment the object of the game is to form as many three-letter, four-letter, five-letter, six-letter and seven-letter words as possible, horizontally and vertically of the grid. In other embodiments suitable word lengths are indicated as the object of the game according to the size of the grid.

In playing the game, each player is given a gameboard 50 which is pulled out of the kit 10 by means of the knob 64. The gameboard is placed in front of the player as shown in FIG. 3, and preferably the gameboard is slightly tilted at an angle to the horizontal supporting surface of the table or the like. For this purpose, the gameboard is provided with an easel device 65 foldably mounted as shown in FIG. 8.

The invention contemplates that each gameboard 50 be provided with a shield assembly 100 in order to conceal the playing field of the gameboard from the view of the opponents as illustrated in FIG. 3. As best shown in FIG. 2, the shield assembly 100 is constituted by a rectangular shaped cardboard plate 102.

Plate 102 is preferably provided with identifying indicia 114 along one long edge thereof.

An index chart 115 (see FIG. 17) is provided in the kit 10 giving a list of point values of words as indicated at 117, and providing an index of the letters appearing on the cubes 80, as indicated at 119.

The game is played in the following manner, it being understood that the game is to be played by two or more individuals or players, four players being shown in FIG. 3.

In this embodiment, the players are first supplied each with a game set including a gameboard 50, with font 68 and grid 66 therein, and with three sets of twenty cubes 80 each in the font 68. The object of the game is to form as many three-letter, four-letter, five-letter, six-letter and seven-letter words as possible, horizontally and vertically.

In playing, the first player, after choosing his first letter, consults the index chart 115 and then selects a cube 80 upon which the selected letter appears. The first player may then place the cube in any pocket 72 in his grid 66. The other player or players must use the same letter from any cube 80 upon which it appears and place the cube in any pocket 72 in his own grid. Once a cube has been placed in a pocket it may not be moved elsewhere.

Each player, in turn, selects a cube with a letter to be used by all players. The game is completed when all the pockets have been filled with cubes 80. The winner is the play having the greatest number of correct words in the grid when the pockets are filled.

All words of three or more letters count in the scoring. On the inner surface of cover 24 in FIG. 2, there is shown a sample crossword puzzle game played with the apparatus of the present invention.

In FIGS. 9 to 13, inclusive, a modification of the invention is illustrated including a modified form of kit 10'. The kit includes a rectangular shaped hollow body 121, with bottom wall 123, rear wall 127, top wall 125, and end walls 129, 129, and open at the front. Finger notches 120 are formed in the bottom and top walls at the centers thereof. A partitioned frame 131 is removably mounted in the body 121. The frame includes a rectangular shaped body 12', having bottom wall 14', rear wall 16', and end walls 18', 18', open at the front and top as viewed in FIG. 10, and formed of cardboard or other suitable material. A pair of spaced partition walls 20', 20' divide the interior of the body into compartments extending the length of the body and from the front to the rear wall 16'. Finger notches 120' are formed in the partition walls 20' and in bottom wall 14'.

A crossword puzzle gameboard 50' is removably mounted in each compartment 22' in the body. The gameboard 50' is similar to the gameboard 50.

In the kit 10' modified means are provided for supporting the gameboard 50' on its horizontal supporting surface at a slight angle to the horizontal. In place of the folding metal or plastic easel 65, a triangular shaped wing 90' is hingedly mounted on the bottom surface of the base 60' of the gameboard or drawer 50' as shown in FIG. 13. Fonts and grids similar to font 68 and grid 66 are supplied with the kit 10' for use with the gameboards 50', as well as a supply of playing pieces, such as the cubes 80.

The shield 102 may be removably supported by a separate clip 134 (FIG. 19) of flexible plastic material detachably mounted on a reduced portion 136 of the front sill 54'' of a further modified form of gameboard shown in FIG. 18. The clip 134 comprises a rectangular shaped plate-like body 138 with a slanting slot 140 intercepting one end thereof and with a slot 142 intercepting the other end of the body, the edges of slot 142 tapering downwardly and inwardly as viewed in FIG. 19 so that the clip is adapted to be snapped onto the reduced portion 136 of the front sill 54''.

I claim:
1. A game kit, comprising a rectangular shaped body having an interior space; a cover hingedly mounted on said body; spaced partition walls dividing the interior space in the body into compartments; gameboards removably mounted in said compartments, each gameboard having a rectangular shaped body with a shallow recess therein; a removable frame in said recess for removably storing playing pieces; a removable grid in said recess alongside the frame, said grid having pockets therein; playing pieces loosely mounted in the frame, said playing pieces being cubes having multiple faces with indicia on said faces representing alphabetical letters and an identifying number, said cubes being insertable in the pockets of the grid, an easel foldably mounted on each gameboard for supporting the gameboard at a slight angle to the horizontal when seated on a supporting surface; separate shields in the form of flat plates; and means adapted to support one shield on the topmost wall of each gameboard on one side of the gameboard for concealing the gameboard from an opponent when playing the game.

2. A kit as defined in claim 1, further comprising an index sheet for indicating point values of words of different lengths and for associating the number of each cube with the plurality of letters carried thereby.

References Cited

UNITED STATES PATENTS

| | | |
|---|---|---|
| 1,354,910 | 10/1920 | Ketchum. |
| 3,165,318 | 1/1965 | Lissandrello _____ 273—136 X |

FOREIGN PATENTS

| | | |
|---|---|---|
| 75,369 | 2/1919 | Austria. |
| 1,242,861 | 8/1960 | France. |
| 525,942 | 5/1955 | Italy. |
| 787,287 | 12/1957 | Great Britain. |
| 1,048,472 | 11/1966 | Great Britain. |

DELBERT B. LOWE, Primary Examiner

U.S. Cl. X.R.

273—136, 137